United States Patent [19]

Plosz

[11] Patent Number: 5,401,063
[45] Date of Patent: Mar. 28, 1995

[54] PRIMARY/SECONDARY RETAINER FOR BEADED/FLARED TUBING

[75] Inventor: James V. Plosz, Lincoln Park, Mich.

[73] Assignee: Enhanced Applications, L.C., Lincoln Park, Mich.

[21] Appl. No.: 93,802

[22] Filed: Jul. 19, 1993

[51] Int. Cl.⁶ .............................................. F16L 35/00
[52] U.S. Cl. ........................................ 285/81; 285/93; 285/319; 285/320
[58] Field of Search ............... 285/311, 312, 314, 320, 285/82, 81, 93, 87, 365, 409, 5

[56] References Cited

U.S. PATENT DOCUMENTS

| | | | |
|---|---|---|---|
| 1,261,687 | 4/1918 | Brandon | 285/312 |
| 1,402,912 | 1/1922 | Thompson | 285/312 X |
| 3,124,374 | 3/1964 | Krapp | 28/312 X |
| 4,008,937 | 2/1977 | Filippi | 285/409 X |
| 4,423,892 | 1/1984 | Bartholomew . | |
| 4,925,217 | 5/1990 | Ketcham . | |
| 4,936,544 | 6/1990 | Bartholomew . | |
| 4,979,765 | 12/1990 | Bartholomew . | |
| 5,002,315 | 3/1991 | Bartholomew | 285/319 X |
| 5,033,513 | 7/1991 | Bartholomew . | |
| 5,042,849 | 8/1991 | Kersting | 285/312 |
| 5,063,968 | 11/1991 | Bartholomew . | |
| 5,110,161 | 5/1992 | Bartholomew . | |
| 5,152,555 | 10/1992 | Szabo . | |
| 5,161,833 | 11/1992 | McNaughton et al. | 285/319 |

*Primary Examiner*—Dave W. Arola
*Attorney, Agent, or Firm*—Harness, Dickey & Pierce

[57] ABSTRACT

A connector assembly for use with tubular conduits which mate with a housing having an axial bore for receiving one end of the conduit is disclosed and includes a latching mechanism which is pivotally attached to the housing. The latching mechanism is pivotally rotated to engage an annular projection contained on the tubular conduit to retain the conduit within the housing. Additionally, the connector assembly may be provided with dual latching mechanisms.

26 Claims, 3 Drawing Sheets

PRIMARY/SECONDARY RETAINER FOR BEADED/FLARED TUBING

BACKGROUND OF THE INVENTION

The present invention relates to a connector assembly for fluid conveying conduits and, more particularly, to a connector assembly including a latching mechanism useful for confirming connection between the male conduit and female housing elements of the connector assembly.

In the automotive industry, as well as for many other industries, the need always exists for low cost, reliable, and easy to assemble components. This need is especially apparent with respect to providing a connection between fluid conveying conduits, such as fuel or refrigerant lines. Older threaded connectors typically require substantial assembly time for screwing on a cap to a fitting and tightening the cap down to the proper torque needed to provide a fluid tight seal. Further, an inventory would have to be maintained to keep track of the number of caps and fittings and any liners for other components that may be necessary. Also, re-tightening of the caps may be required to maintain the seal after the automobile or other system has been put into use.

Recently therefore there has been a move towards utilizing connector assemblies and particularly quick connector assemblies wherein a threaded connection is no longer needed to connect the male conduit and female housing elements. Quick connector assemblies typically include a female housing, a male conduit and some type of retainer for securing the male conduit within the female housing. One problem with many of the known quick connector assemblies is the failure to provide a check mechanism to insure that the male conduit is securely connected to the female housing. Further, for those connector assemblies including some type of check mechanism the mechanism is typically disposed within the female housing which precludes a visual inspection of the quick connector assembly to confirm a complete coupling between the male conduit and the female housing.

Accordingly, it is the primary object of the present invention to provide an improved connector assembly for providing a quick connection between fluid conveying conduits wherein the latching mechanism serves to insure that a proper connection has been made between the tubular conduit and the housing.

In addition, it is an object of the present invention to provide a visual inspection device to periodically insure that the connection has been maintained.

Yet another object is to provide a secondary coupling between the tubular conduit and the housing.

Still another objection of the present invention is to provide an easily connectable assembly, which is inexpensive to manufacture, durable and may be employed to join dissimilar electrically conducted materials that would otherwise be subject to galvanic corrosion.

To achieve the foregoing objects, the present invention provides a connector assembly which generally comprises a tubular conduit, a housing, sealing means, latching means and under at least one embodiment retainer means. The tubular conduit is adapted to convey fluid and is formed with a first annular projection disposed a predetermined distance from the end of the conduit to be connected. The housing is formed with an axial bore for receiving the conduit at a first end and for providing a fluid path at a second end. The housing includes a collar for pivotally hosting the latching means and under certain embodiments receiving the retainer means. The sealing means are disposed within the axial bore of the housing for providing a fluid tight seal between confronting portions of the conduit and housing. The retainer means is adapted to be disposed generally over the first end of the tubular conduit and extends partially within the axial bore of the housing. The retainer means includes at least one deformable leg having a blocking portion which seats against the first annular projection. The latching means include a lever and an extending hook portion which is pivotally attached to the collar and can be rotated to engage the annular projection of the tubular conduit. The latching means is provided with at least one projecting nib which assists in maintaining the latching means in an engaged position.

Additional objects and advantages of the present invention will become apparent from a reading of the detailed description of the preferred embodiments which makes reference to the following set of drawings in which;

DETAILED DESCRIPTION OF THE PREFERRED EMBODIMENT

Figure 1:
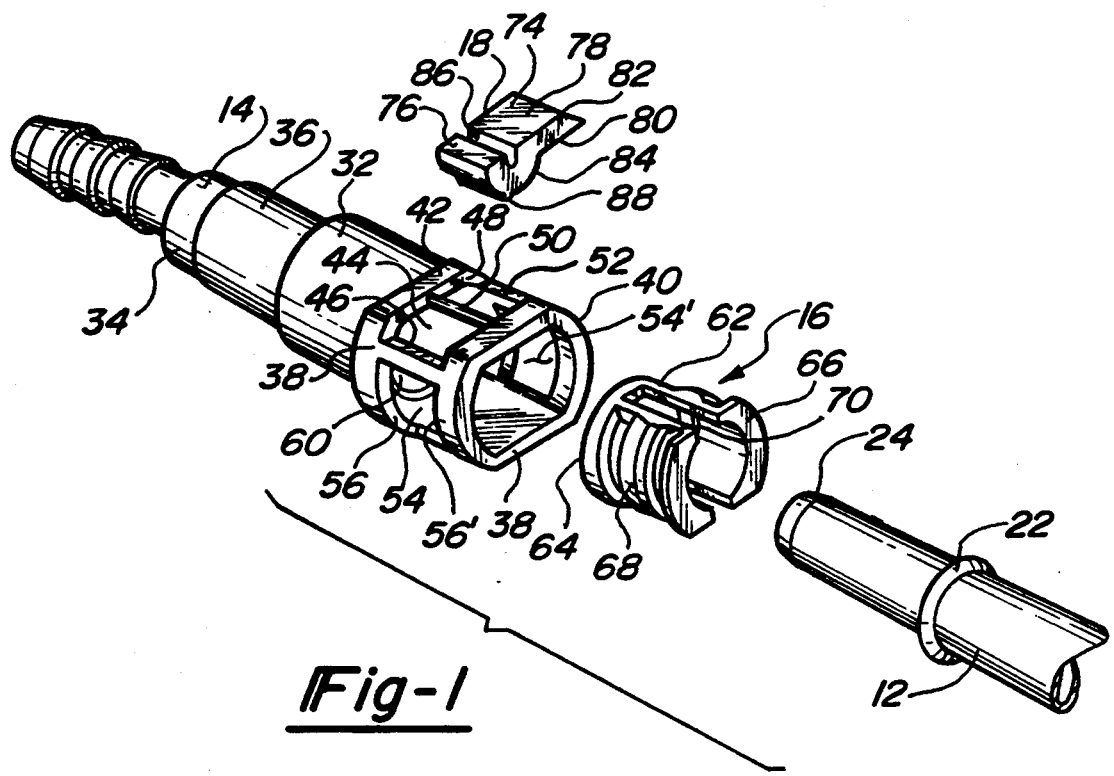
FIG. 1 is a blown out perspective view of a first connector assembly embodiment according to the teachings of the present invention.
Figure 2:
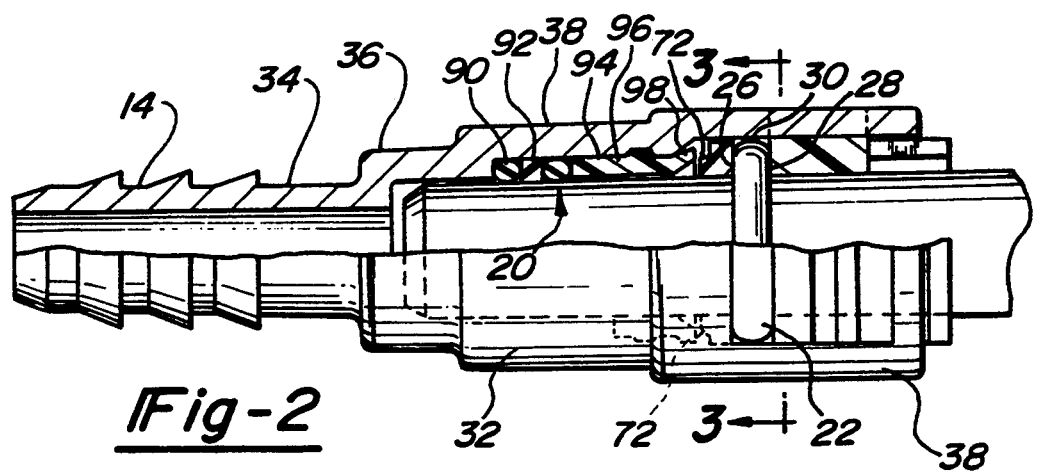
FIG. 2 is a side elevation view, partially in cross-section, of the connector assembly of FIG. 1.
Figure 3:
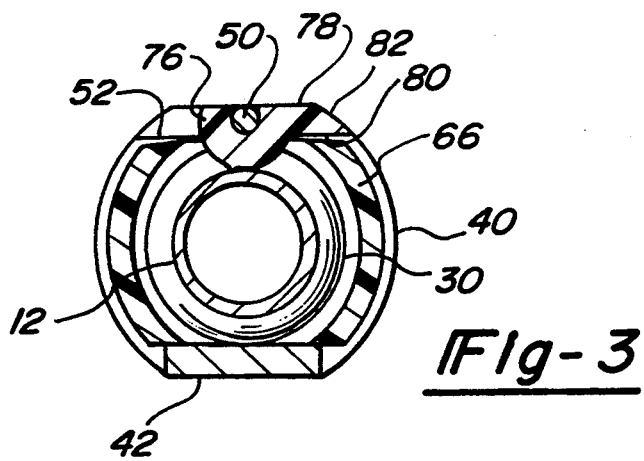
FIG. 3 is an end view of the first connector assembly taken along lines 3—3 of FIG. 2.

Referring to FIGS. 1, 2 and 3 a first connector assembly embodiment 10 according to the teachings of the present invention is shown. The connector assembly 10 is generally comprised of tubular conduit 12 adapted to convey fluid, a housing 14, a retainer element 16, a latching mechanism 18, and sealing means 20 as demonstrated with reference to FIG. 2. Conduit 12 is provided with a first outwardly projecting annular portion 22 displaced from a beveled connecting end 24 of the conduit. The annular projection 22 is formed with first and second blocking wall portions 26 and 28, respectively, disposed substantially transversely or perpendicularly to the central longitudinal axis of the conduit and an outer diameter 30 as shown more clearly with reference to FIG. 2.

The housing 14 may include multiple sections, but typically includes an enlarged diameter portion 32, a reduced diameter portion 34, and a transitional diameter portion 36. Internally, the housing includes an axial bore 60 for receiving the sealing means and the first end of the conduit.

Extending from the enlarged diameter portion 32 of the housing 14 is a coupling member 38 having a substantially round or oval shape. The diameter of the coupling member 38 is provided with an arcuate portion 40 and at least one substantially flat wall 42. Coupling member 38 also includes slot 44 disposed along the flat side wall 42. The slot 44 has an overall rectangular shape including shorter ends 46 and longer sides 48. Along each end 46 the slot 44 is provided with substantially flat landing surfaces 52. Extending between the longer sides 48 at approximately the center point between the two ends 46 is a post member 50 for hosting the pivotable latching mechanism 18.

Located on the arcuate portion 40 are windows 54 and 54' which extend through to the axial bore 60. The windows 54 and 54' include blocking walls 56 and 56' which are disposed transversely to the post member 50.

The retainer element 16 is made from a resilient material, such as metal or plastic, and is comprised of a pair of elongated legs 62 normally extending at an angle from opposite ends of a ring member 64. The ring member 64 is preferably formed with a beveled downwardly tapering lip 72 which extends away from the deformable legs 62. Each leg includes an outwardly projecting flange 66 disposed along the distal portion of the leg 62 and a tab portion 68 extending at approximately the center of each leg. Located between the tab portions 66 and flanges 68 are transverse grooves 70.

Sealing means 20 are also typically provided and disposed within the axial bore 60 to assist in providing a fluid tight seal. The sealing means typically include a pair of elastomeric O-rings 90 spaced apart by an annular bushing 92. Optionally, and preferably, a top-hat type bushing 94 is also provided within the axial bore. The top-hat type bushing 94 includes an annular portion 96 which extends into the enlarged diameter portion 32 of the housing and a radially outwardly flared end 98 which extends into the coupling member 38. The flared end 98 is particularly suited to receive the beveled lip 72 of the retainer members ring 64.

The latching mechanism 18 which is disposed transversely to the axis along which the tubular conduit and housing are connected includes a lever 74 and a hook portion 76 which extends from the lever. The lever 74 includes substantially flat top and bottom surfaces 78 and 80, respectively, and an end portion 82. Hook portion 76 which extends below the bottom surface 80 of the lever, is hemispherical in cross-section and includes an arcuate outer surface 84 and an arcuate groove 86 extending from the top surface 78. The arcuate groove 86 is sized to fittingly engage the post member 50 such that the hook portion 76 can be pivoted about the post member 50. Disposed on the outer arcuate surface 86 is a nib 88 positioned slightly over center which assists in maintaining the latching mechanism 18 in an engaged position.

Figure 4:
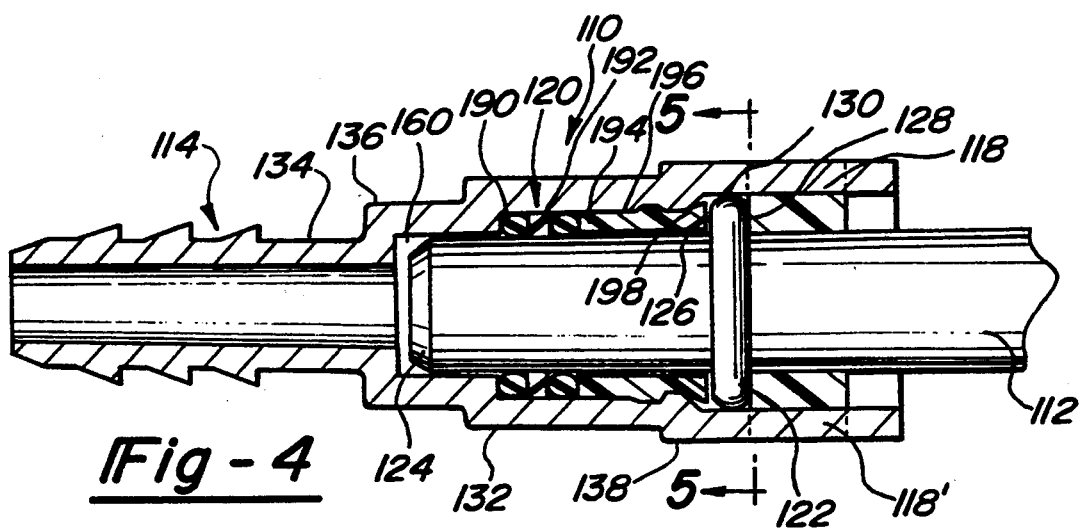
FIG. 4 is a side elevation view, partially in cross-section, of a second connector assembly embodiment according to the teachings of the present invention.
Figure 5:
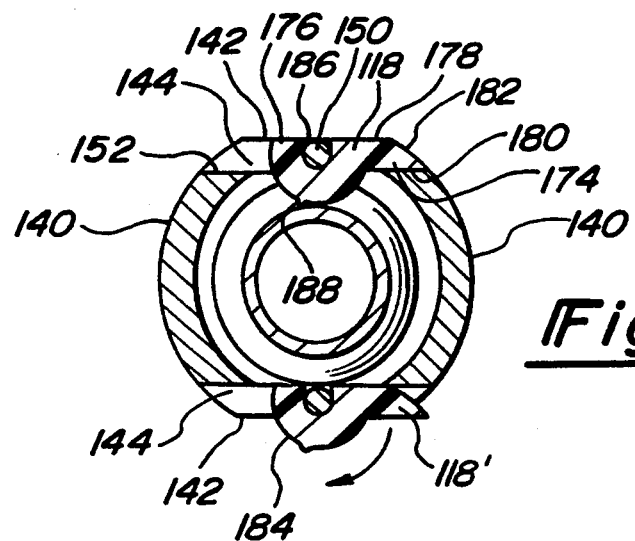
FIG. 5 is an end view of the second connector assembly taken along lines 5—5 of FIG. 4.

Referring to FIGS. 4 and 5, a second connector assembly embodiment 110 is shown. According to the embodiment shown in FIGS. 4 and 5, the connector assembly 110 includes a tubular conduit 112 adapted to convey fluid, a housing 114, a pair of latching mechanisms 118 and 118' and sealing means 120. The conduit 112 is substantially identical to the one shown in FIGS. 1-3 and includes a first outwardly projecting annular portion 122 displaced from a beveled connecting end 124, with the annular projection 122 including first and second blocking walls 126 and 128 and an outer diameter 130.

The housing 114 includes an enlarged diameter portion 132, a reduced diameter portion 134 and a transitional diameter portion 136. Extending through the housing 114 is an axial bore 160 for receiving the sealing means and the leading end of the conduit. Extending from the enlarged diameter portion 132 is the coupling member 138 which includes two arcuate diameter portions 140 and two substantially flat side walls 142. Slots 144 are disposed on each of the two side walls 142 and again have an overall rectangular shape including shorter ends and longer sides with a post member 150 extending between the sides. Along each end the slots 144 are provided with substantially flat landing surfaces 152.

Sealing means 120 are disposed within the axial bore 160 and typically include a pair of elastomerical rings 190 spaced apart by an annular bushing 192. A top hat bushing 194 which includes an annular portion 196 and an outwardly flared portion 198 which extends into the coupling member 138 is also provided.

The pair of latching mechanisms 118 and 118' are disposed on opposite ends along the flat side walls 142 of the coupling member. Latching mechanisms 118 and 118' again include a lever 174 and a hook portion 176 which extends from the lever. Each lever 174 includes substantially flat top and bottom surfaces 178 and 180 and an end portion 182. The hook portion 176 includes an outer arcuate surface 184 and an arcuate groove 186 extending from the top surface 178. The inner arcuate groove 186 is preferably sized to fittingly engage the post member 150 such that the hook portions can be pivoted about the post members. Hereto, each outer arcuate surface 184 is provided with a nib 188 positioned slightly over center to assist in maintaining the respective latching mechanism 118 and 118' in an engaged position.

Figure 6:
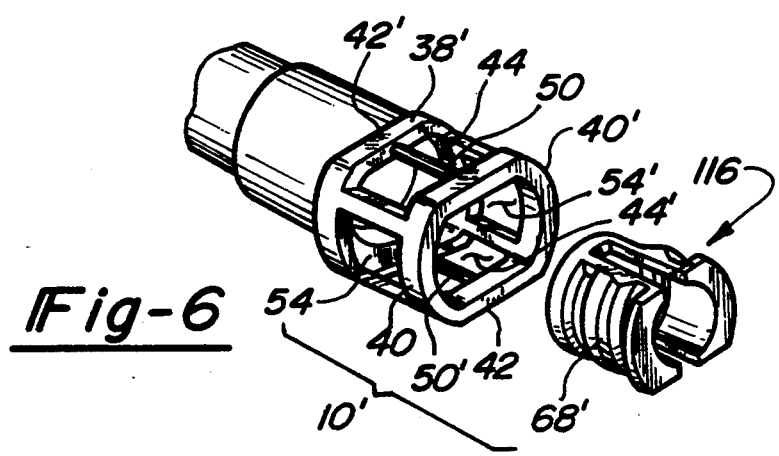
FIG. 6 is a perspective view of a third connector assembly embodiment.

Under the embodiment of FIG. 6 a hybrid of the embodiments shown in FIGS. 1-3 and 4-5 is provided. The only significant difference between this embodiment and embodiment demonstrated in FIGS. 1-3 is that dual latching mechanisms 118 and 118' as shown in FIG. 5 are provided on opposite ends along the substantially flat side walls as secondary conduit retaining means. Under this embodiment 10' a retainer element 116 is provided as the primary retainer means. The coupling member 38' includes two arcuate diameter portions 40 and 40' and two substantially flat side walls 42 and 42'. The coupling member 38' also includes slots 44 and 44' disposed along the flat side walls 42 and 42' respectively. Both slots 44 and 44' have overall rectangular shapes and include shorter ends and longer sides with post members 50 and 50' extending between the sides at the approximate center point. Provided on the arcuate walls 40 and 40' are the windows 54 and 54' for receiving the extending tab portions 68' of the retainer element 116. Sealing means (not shown) identical to those demonstrated in FIGS. 2 and 4 are preferably utilized under this embodiment.

Figure 7:
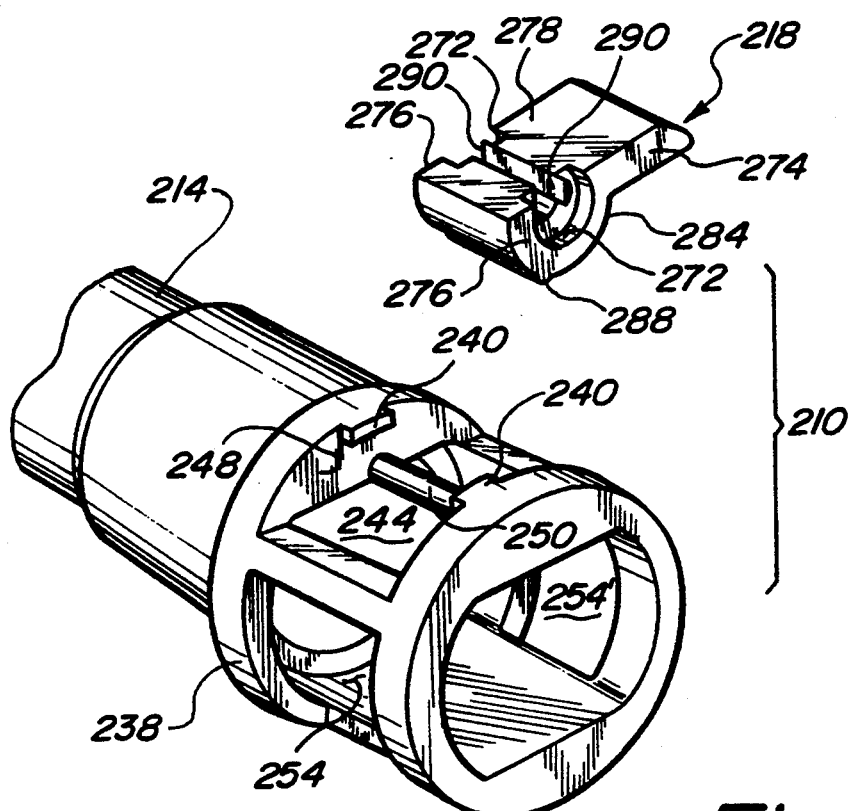
FIG. 7 is a perspective view of a preferred adaptation for the various connector assembly embodiments.
Figure 8:
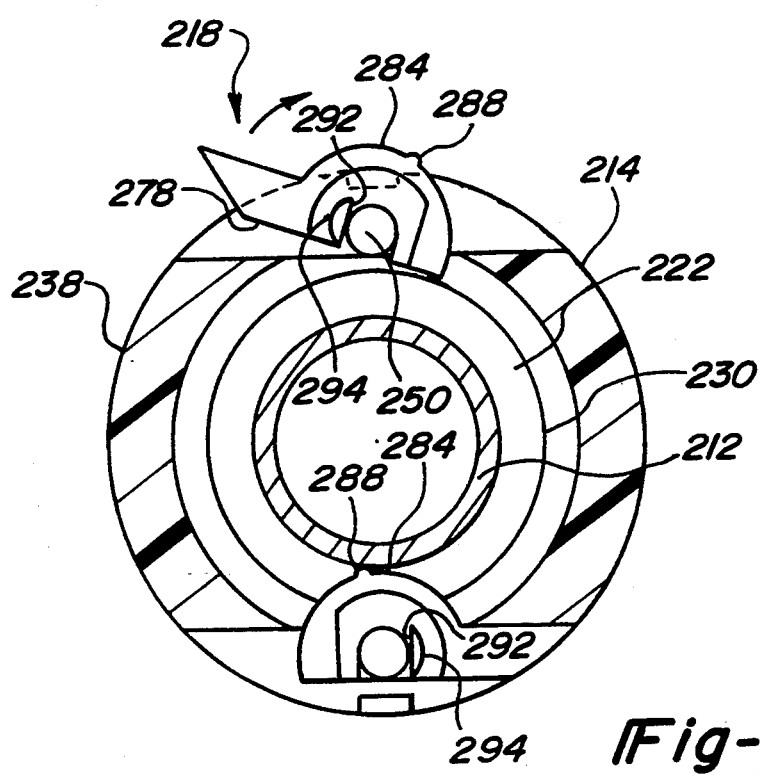
FIG. 8 is an end view of the adaptation of FIG. 7.

As demonstrated in FIG. 8 if the latching mechanism were to engage the outer diameter of the annular projection due to an incomplete insertion of the conduit within the housing, continued rotation of the lever would normally cause the latching mechanism to lift off of the post. The coupling member and latching mechanism are therefore preferably provided with means to preclude detachment of the latching mechanism from the post member. As can be seen from a review of FIGS. 7 and 8 the means for precluding detachment of the latching mechanism from the post member can be incorporated into embodiments utilizing both single and dual latching mechanisms. Preferably the various embodiments demonstrated in FIGS. 1–6 will include the means for precluding detachment of the latching mechanism(s) from the post member(s). Again, the latching mechanism 218 includes a lever 274 and a hook portion 276 which includes an outer arcuate surface 284 having an extending nib 288. Under this modified embodiment 210 the latching mechanism 218 includes arcuate recessed areas 272 disposed along each side wall of the hook portion 276. Extending into the recessed areas 272 are studs 290. The coupling member 238 is modified to include stops 240 which extend inwardly toward each other from the side walls 248 of the slot 244.

As demonstrated in FIG. 8 as the lever 274 is rotated in a clockwise direction from the viewers perspective if the top surface 278 of the latching mechanism 218 were to engage the outer diameter 230 of the annular projection 222 due to an incomplete insertion of the conduit 212 within the housing, the coupling member 238 of housing 214 the studs 290 would contact the stops 240 thus forcing the latching mechanism 218 to remain seated on the post member 250. Preferably, the studs 290 have a substantially flat inner surface 292 and an arcuate outer surface 294. This structure allows the inner surface 292 to ride over the post member 250 and further allows the outer surface 294 to clear the stops when the conduit is fully inserted within the housing.

It should be noted that one skilled in the art would recognize that the retainer element 16 utilized in the embodiments demonstrated in FIGS. 1–3 and 6 could also be utilized with the embodiment demonstrated in FIG. 7. In the event that the retainer element 16 is not required, the windows shown as reference numerals 254 and 254′ would no longer be required.

While the above description constitutes the preferred embodiments of the present invention, it will be appreciated that the invention is susceptible to modification, variation and change without departing from the proper scope and entire meaning of the accompanying claims.

What is claimed is:

1. A connector assembly, comprising:
   a tubular conduit including a first end having an annular projection disposed a predetermined distance from said first end, said annular projection including at least one blocking wall;
   a housing including an axial bore for receiving the first end of said conduit, said housing including an enlarged coupling portion, said coupling portion including at least one slot having a post member extending across said slot; and
   latching means pivotally connected to said post member for locking said conduit within the housing, said latching means being disposed transversely to the axis along which the tubular conduit and housing are connected;
   whereby upon pivotally rotating said latching means such that said latching means engage said blocking wall provided on said annular projection of said conduit, the conduit becomes locked within the housing.

2. The connector assembly according to claim 1, wherein said latching means further comprise a latching mechanism including a lever and a hook extending from said lever, said hook including a groove for pivotally mating with said post member.

3. The connector assembly according to claim 2, wherein a pair of latching mechanisms are utilized.

4. The connector assembly according to claim 2, further comprising means for maintaining the connection of said latching mechanism to said post member within said slot.

5. The connector assembly according to claim 4, wherein said means for maintaining the connection of said latching mechanism within said slot includes a stud contained on said hook portion, whereby upon rotating the latching mechanism the stud engages a stop extending into the slot to preclude the latching mechanism from becoming detached from the post member.

6. The connector assembly according to claim 2, further comprising means for maintaining said latching mechanism in a locked position engaging said annular projection.

7. The connector assembly according to claim 6, wherein said means for maintaining said latching mechanism in a locked position includes a nib extending from said hook, whereby said nib seats against the outer diameter of said conduit when the latching mechanism is rotated to a locked position.

8. The connector assembly according to claim 1, wherein said coupling portion further comprises a pair of spaced apart windows, each of which includes a blocking wall.

9. The connector assembly according to claim 8, further comprising a retainer means selectively disposable within said coupling portion, said retainer means including an annular ring having at least one deformable leg extending rearwardly therefrom, said deformable leg including a radially extending tab portion and a radially extending flange separated by a channel, whereby said radially extending tab portion engages said blocking wall for selectively locking said retainer means within said coupling portion and said conduit within said housing.

10. The connector assembly, comprising:
    a tubular conduit including a first end having an annular projection including at least one blocking wall disposed a predetermined distance from said first end;
    a housing for receiving the first end of said conduit, said housing including an axial bore and an enlarged coupling portion; and
    latching means pivotally connected to said coupling portion for maintaining the first end of said conduit within the housing;
    said coupling portion including a slot for receiving said latching means, said slot having a post member extending thereacross.
    said latching means including a lever and a hook portion extending from the lever, said hook portion including a groove for pivotally mating with said post member and an arcuate portion extending below said lever and said lever portion being disposed transversely to the axis along which the tubular conduit and housing are connected;
    whereby upon pivotally rotating said latching means such that the arcuate portion engages said blocking wall of said annular projection, said conduit becomes substantially locked within said housing.

11. The connector assembly according to claim 10, further comprising means for maintaining said latching mechanism in a locked position engaging said annular projection.

12. The connector assembly according to claim 10, wherein said means for maintaining said latching mechanism in a locked position includes a nib extending from said hook, whereby said nib seats against the outer diameter of said conduit when the latching mechanism is rotated to a locked position engaging said annular projection.

13. The connector assembly according to claim 10, wherein said coupling portion further comprises a pair spaced apart windows, each of which includes a blocking wall.

14. The connector assembly according to claim 13, further comprising a retainer means selectively disposable within said coupling portion, said retainer means including an annular ring having at least one deformable leg extending rearwardly therefrom, said deformable leg including a radially extending tab portion and a radially extending flange separated by a channel, whereby said radially extending tab portion engages said blocking wall for selectively locking said retainer means within said coupling portion and said conduit within said housing.

15. The connector assembly according to claim 10, wherein a pair of latching mechanisms are utilized.

16. The connector assembly according to claim 10, further comprising means for maintaining the connection of said latching mechanism to said post member within said slot.

17. The connector assembly according to claim 16, wherein said means for maintaining the connection of said latching mechanism within said slot includes a stud contained on said hook portion, whereby upon rotating the latching mechanism the stud engages a stop extending into the slot to preclude the latching mechanism from becoming detached from the post member.

18. A connector assembly, comprising:
a tubular conduit including a first end having an annular projection disposed a predetermined distance from said first end;
a housing including an axial bore for receiving the first end of said conduit, said conduit including an enlarged coupling portion, said coupling portion including at least one slot, said at least one slot having a post member extending thereacross;
latching means pivotally connected to said post member for maintaining the conduit within the housing, said latching means being disposed generally transversely to the axis along which the tubular conduit and housing are connected; and
means for maintaining said latching means within said at least one slot.

19. The connector assembly according to claim 18, wherein said latching means further comprise a latching mechanism including a lever and a hook extending from said lever, said hook including a groove for pivotally mating with said post member.

20. The connector assembly according to claim 19, wherein said means for maintaining said latching mechanism in a locked position includes a nib extending from said hook, whereby said nib seats against the outer diameter of said conduit when the latching mechanism is rotated to a locked position engaging said annular projection.

21. The connector assembly according to claim 19 wherein said means for maintaining said latching means within said at least one slot includes at least one stud extending laterally from said hook portion, whereby upon rotating the latching mechanism the at least one stud engages a stop extending into the slot to preclude the latching mechanism from becoming detached from the post member.

22. The connector assembly according to claim 21, further comprising means for maintaining said latching mechanism in a locked position engaging said annular projection.

23. The connector assembly according to claim 21, wherein a pair of latching mechanisms are utilized.

24. The connector assembly according to claim 21, further comprising means for maintaining the connection of said latching mechanism to said post member within said slot.

25. The connector assembly according to claim 18, wherein said coupling portion further comprises a pair spaced apart windows, each of which includes a blocking wall.

26. The connector assembly according to claim 25, further comprising a retainer means selectively disposable within said coupling portion, said retainer means including an annular ring having at least one deformable leg extending rearwardly therefrom, said deformable leg including a radially extending tab portion and a radially extending flange separated by a channel, whereby said radially extending tab engages said blocking wall for selectively locking said retainer means within said coupling and said conduit within said housing.

* * * * *